Nov. 2, 1954 W. M. EAKIN 2,693,053
GLASS CUTTING MACHINE
Filed April 12, 1952 2 Sheets-Sheet 1
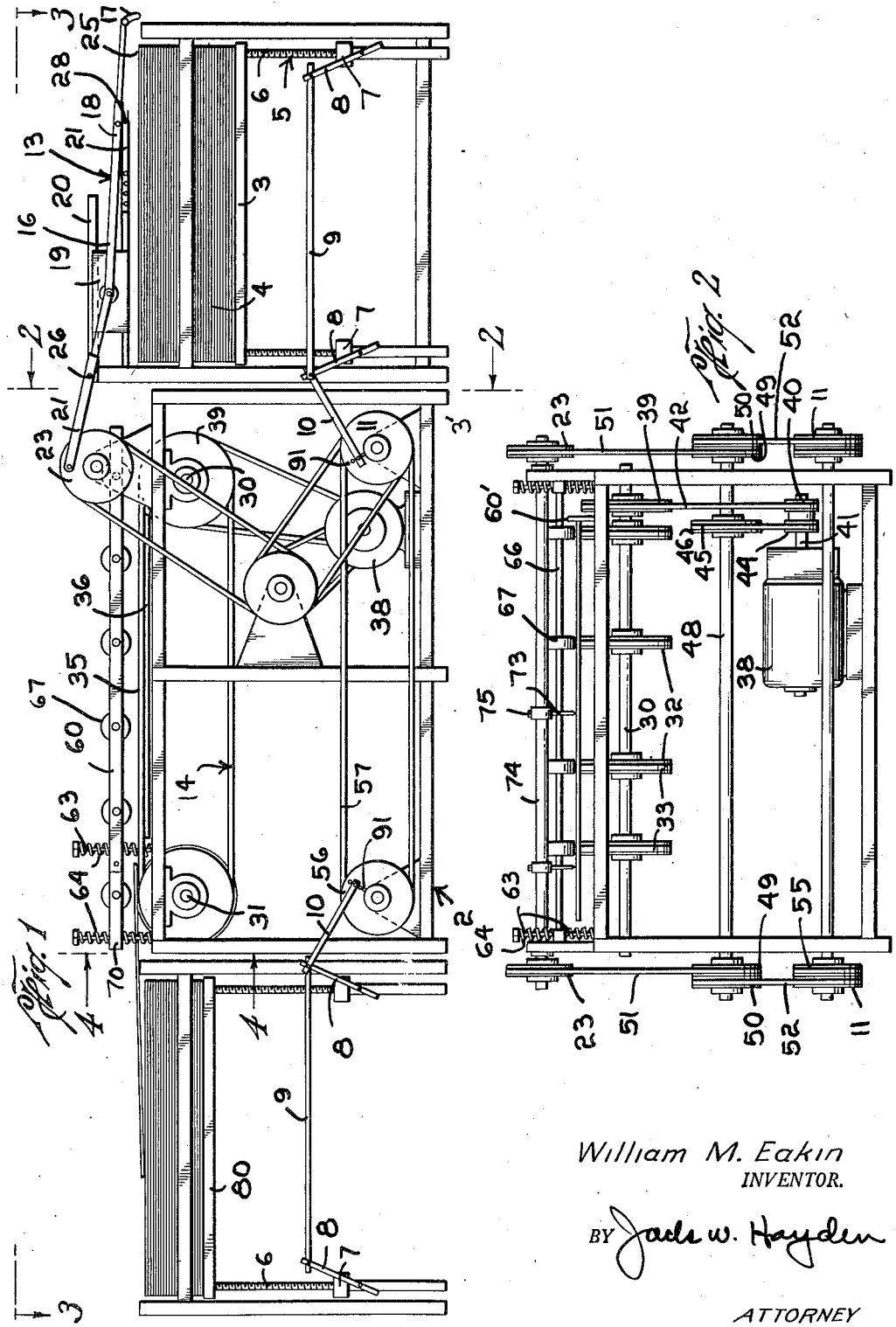
William M. Eakin
INVENTOR.
BY Jack W. Hayden
ATTORNEY

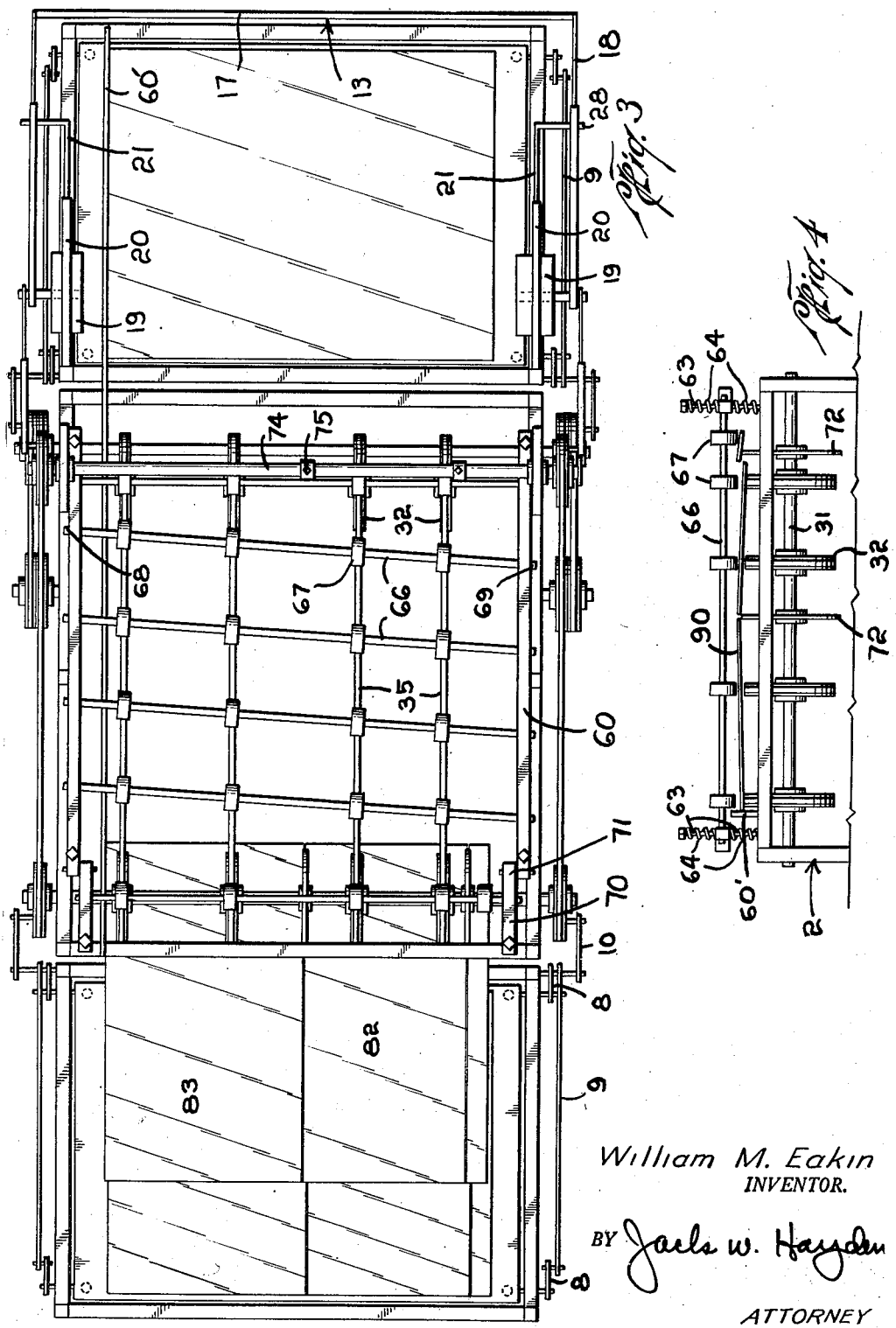

United States Patent Office 2,693,053
Patented Nov. 2, 1954

2,693,053

GLASS CUTTING MACHINE

William M. Eakin, Houston, Tex.

Application April 12, 1952, Serial No. 281,943

1 Claim. (Cl. 49—48)

The invention relates to a novel and improved apparatus for severing glass sheets.

Various automatic devices have been proposed for cutting or severing glass sheets; however, such devices have not proved successful because of the difficulty in maintaining the sheet aligned with a breaker plate or roller so as to obtain a clean break of the sheet glass along a scored line.

The present apparatus contemplates a means for resiliently urging the glass to a predetermined position as it is conveyed forwardly through such apparatus so as to maintain it in alignment with a breaker roller or breaker plate whereby the plate may be cleanly broken along a predetermined line.

Another object of the invention is to provide an apparatus for severing glass sheets including a plurality of conveyors mounted in a horizontal plane to convey the glass plate through the apparatus, means mounted above such conveying means and at the forward end of the machine for scoring the glass sheet, and breaker means mounted at the opposite end of the machine for contacting the scored glass sheet and breaking it along the score line.

Another object of the invention is to provide an apparatus for severing glass including a plurality of conveyers mounted in a horizontal plane to convey the glass plate through the apparatus, means mounted above such conveying means and at the forward end of the machine for scoring the glass sheet, breaker means mounted at the opposite end of the machine for contacting the scored glass sheet and breaking it along the scored line, and additional means for maintaining the glass aligned with the breaker means as it is conveyed through the apparatus.

Another object of the invention is to provide an apparatus for severing glass including a plurality of conveyers mounted in a horizontal plane to convey the glass plate through the apparatus, means mounted above such conveying means and at the forward end of the machine for scoring the glass sheet, and breaker means mounted at the opposite end of the machine for contacting the scored glass sheet and breaking it along the scored line and additional means maintaining the glass aligned with the breaker means as it is conveyed through the apparatus, said means including a guide rail mounted at the side of said conveying means and a plurality of resiliently mounted rollers mounted above said conveying means for urging the glass sheet sidewardly against said guide rail as the glass sheet is conveyed through the machine.

Still another object of the invention is to provide in a glass severing apparatus means for receiving a stack of glass sheets, means for elevating such stack a step at a time and additional means for pulling the glass sheets off the stack and into the apparatus, said pulling means and elevating means so coordinated and timed so that the top of the stack of glass sheets is aligned with the entrance of the apparatus for receiving the glass sheets from such stack into the apparatus.

Still another object of the invention is to provide in a glass severing apparatus means for receiving a stack of glass sheets, means for elevating such stack a step at a time, means for pulling the glass sheets off the stack and into the apparatus, said pulling means and elevating means so coordinated and timed that the top of the glass sheets is aligned with the entrance of the apparatus for pulling a glass sheet into the entrance, additional means at the discharge side of the apparatus for receiving the severed glass sheets, there being means connected to such receiving means for lowering it as the severed glass sheets are discharged thereon so as to maintain the last discharged sheet in substantially the same plane as the discharge plane of the apparatus, and said lowering means being coordinated and timed with said elevating means at the front of the apparatus and with said pulling or feeding means so that they all three operate in timed relation.

Still another object of the apparatus is to provide means for conveying a scored glass sheet against a breaker so as to sever such sheet along the scored line.

Still another object of the apparatus is to provide means for conveying a scored glass sheet against a breaker so as to sever such sheet along the scored line, and means maintaining the glass sheet aligned with the breaker wheel by urging it to a predetermined position as it is conveyed against such breaker wheel.

Still another object of the invention is to provide a machine for receiving a plurality of scored glass sheets and breaking them along a predetermined line.

A still further object of the invention is to provide an automatic feeding device for a glass severing machine whereby various size glass sheets may be severed by such machine.

A still further object of the invention is to provide a glass severing machine for severing glass into various sizes.

Other objects and advantages of the invention will become more readily apparent from a consideration of the following description and drawings, wherein:

Fig. 1 is a side elevation illustrating the preferred embodiment of the invention including the automatic feeding and discharge receiving means;

Fig. 2 is a vertical elevation on the line 2—2 of Fig. 1 and illustrates the relationship of the operating mechanism at the forward end of the machine;

Fig. 3 is a top plan view of the apparatus shown in Fig. 1;

Fig. 4 is a partial vertical elevation on the line 4—4 of Fig. 1 and shows the relationship of the operating mechanism at the rear end of the machine.

As shown in Fig. 1 the apparatus is mounted on a suitable frame designated generally by a numeral 2. This frame may be of any desirable construction so as to support the operating mechanism of the invention. At the forward end 3' of the apparatus there is provided a table means 3 for receiving a stack 4 of glass sheets to be severed. The table 3 is shown as being mounted on the elevating means 5 which is in the form of a jack shaft 6 and operating mechanism therefor 7, which in turn is actuated by the rod 8 connected to the rod 9 which is connected to the lever 10 mounted on the V pulley 11 so that as such pulley rotates the lever 10 will be reciprocated. This in turn reciprocates the rod 9 and the connecting rod 8 so that the operating mechanism 7 in conjunction with the jack shaft 6 elevates the table 3.

The operating mechanism 7 and the jack shaft 6 may be of any conventional type and it is deemed unnecessary to give a detailed description thereof.

Feeding means 13 are provided at the top of the stacked sheets 4 so as to pull such sheets on to the conveying means 14. The feeding means as illustrated consists of a frame 16 as best seen in Figs. 1 and 3. This frame includes an end member 17 and side members 18, which side members are in turn connected to the reciprocating housing 19 mounted in the spaced tracks 20 and 21 on each side of the apparatus.

Connected to the housing 19 is a lever 21 which is in turn connected to a pulley 23 so that rotation of such pulley reciprocates the lever 21 and connected housing 19. This moves the housing 19 on the tracks 20 and 21 so as to move the feeding mechanism 13 outwardly whereby the end member 17 may engage the top 25 of the stacked sheets of glass so as to pull such sheets forwardly onto the conveying means 14 when the pulley 23 completes its cycle of rotation. It should be noted that the lever 21, side members 18, and track 21 are all adjustable in length by suitable means such as the screw 26 and cooperating holes 27 so that the length of travel of the feeding mechanism may be regulated. In this manner it is possible to feed glass sheets of various sizes into the apparatus. The outer end 28 of the track 21 as seen in Fig. 3 serves as a rest for the side members 18 so as to keep them from prematurely contacting the top of the glass sheets.

The conveying means 14 also acts as a support for the glass sheets as they are conveyed through the apparatus. Such means consists of a pair of spaced shafts 30 and 31 mounted on the frame with a plurality of belt receiving means such as pulleys 32 mounted thereon. Separate belt means 33 connect each of the pulleys and is there is provided under each of such belts adjacent the upper run 35 thereof a support plate 36 to eliminate sagging of the belt means due to the weight of the glass sheet. This maintains the glass sheet in a horizontal plane as it is conveyed through the machine. A prime mover 38, which may be of any suitable type is provided with suitable gear reducing means for operating at a desired speed, and is connected to the shafts 30 and 31 by means of the pulley 39 mounted on shaft 30 and the pulley 40 mounted on the drive shaft 41 of such prime mover with a belt 42 connecting the pulleys 39 and 41. A pulley 44 on the drive shaft 41 drives shaft 48 through belt 45 and pulley 46 and also drives the pulleys 49 and 50 on each end of such shaft. Connected to the pulley 49 by means of belt 51 is pulley 23 which operates the feeding mechanism as previously described.

Connected to pulley 50 by means of belt 52 is pulley 11 which operates the elevating means 5 as previously described. A pulley 55 is connected to a pulley 56 at the rear of the apparatus by means of belt 57 so as to operate the mechanism for conveying the discharge receiving table as will be more fully described hereinafter.

Mounted at one side of the conveying rollers or means is a guide rail 60' which helps to maintain the plate sheet in alignment as it moves through the machine. Mounted above the upper run 35 of the belt conveyors is a frame 60 which is resiliently supported in a horizontal plane by means of bolts 63 which are provided with spiral springs 64 above and below such frame so as to allow vertical movement thereof relative to the upper run 35 of the belt conveyors.

Mounted in the frame at spaced intervals are a plurality of shafts 66 with rubber rollers 67 thereon for contacting the plate glass as it is conveyed through the apparatus. Particular attention is directed to Fig. 3 of the drawings wherein it is to be noted that one end 68 of the shaft 66 is spaced forwardly of its other end 69 on the other side of the frame. In this manner the glass sheet is urged sidewardly against the guide rail 60' as it is conveyed forwardly through the machine. It is to be noted that the frame 60 is provided with a portion 70 which may move out of the plane of the frame by means of the connection 71.

A breaker roll 72 is arranged on the shaft 31 so as to contact the glass sheet as it is conveyed through the apparatus after having been scored by scoring means such as the knife edge 73 mounted on shaft 74 at the forward end of the machine. The knife 73 extends downwardly toward the belt conveyors so as to contact the glass surface whereby it may be scored along a predetermined line. Such scoring means may be adjustable along the shaft by means of the screw 75. Any suitable number of scoring means may be used and two are shown in the drawings.

The breaker wheel 72 is similarly slidably mounted on the shaft 31 and any suitable number may be provided to correspond with the number of scoring means used. It is to be noted that the breaker plate 72 extends upwardly above the plane of the belt conveyors and is aligned with the scoring means so as to contact the glass plate along such scored line and break it as it is conveyed forwardly through the machine.

As the severed glass sheet is discharged from the machine it is received on table means 80 which is provided with jack shaft means 6 and operating mechanism 7 which shaft and operating mechanism is similar to that described in connection with the table used at the forward end of the apparatus. An operating lever 10 is connected to a rod 9 which is in turn connected to the rod 8 for actuating the jack shaft 6 so as to step-wise lower the table 80 as the severed plates are discharged thereon.

While it is believed that the operation of the machine is apparent by reason of the foregoing description, by way of further amplification and description it will be assumed that a plurality of glass sheets are to be cut into the sizes illustrated such as that shown at 82 and 83 in Fig. 3 of the drawings.

Power from the prime mover is conveyed to the pulley 11, the pulley 23 and the pulley 56 by belt means as previously described. These 3 pulleys are so coordinated and timed that the glass sheets are step-wise raised to place them in position to be fed onto the upper run 35 of the belt conveyor 14, while simultaneously the table 80 is step-wise lowered as the plates are discharged thereon so as to maintain the stack of discharged plates at the proper level to receive the next plates to be discharged from the conveyor means 14.

The feed mechanism 13 reciprocates and pulls the glass sheets onto the conveyer and the rollers 37 continually urge the glass plate sidewardly against the guide or guard rail 60' while the knife edge 73 scores such plate along a predetermined line. The rollers 67 in conjunction with the guard rail 60' maintain the glass sheet in a predetermined position as it is conveyed through the machine. In this manner once the breaker 72 and scoring means 73 are initially aligned, there is little if any change for the plate to get out of alignment with respect to the severing means so that a sharp and clean break of the plate is effected. The portion 70 of the frame 60 being movable out of the normal horizontal plane of such frame accommodates the upward movement of the glass plate as shown at 90 in Figure 4 and encourages breaking of the plate along the scored portion thereof.

The severed plates 82 and 83 are then discharged onto the table 80 which is automatically lowered as previously described. Adjustment means 91 are provided on each of the pulleys 11 and 56 so that the amount of travel of the respective tables may be regulated to accommodate glass plates of various thicknesses.

Broadly the invention relates to an apparatus for severing glass sheets and more particularly to an apparatus which is provided with means for urging the glass sheets sidewardly as it is conveyed forwardly therethrough, and for automatically feeding and discharging the severed glass sheets from such apparatus.

What is claimed is:

A machine for severing glass sheets comprising a frame, a pair of spaced shafts mounted adjacent the top of said frame, a plurality of belt receiving means mounted in spaced relation along each of said shafts, the belt receiving means on one of said shafts being aligned with the belt receiving means on said other shaft, separated belt means on each of said receiving means for supporting and conveying a sheet of glass while it is severed, a support plate of strip-like material extending under said belt means and maintaining said belt means in horizontal position when the sheet glass is resting thereon, a stationary shaft at the front of said machine, a knife edge mounted on said stationary shaft and extending downwardly toward said belt receiving means to score the glass sheet from end to end, a side guide plate extending upwardly above the plane of said belt means, means contacting the glass sheet as said belt means convey it through the machine and continually urging the edge of said glass sheet against said side guide to maintain the glass sheet in alignment as it moves through the machine, said last mentioned means comprising a plurality of shafts mounted above said belt means with one end of each of said shafts moved forwardly of the other end, and a plurality of rollers on each of said shafts for contacting the glass sheet at a plurality of positions on its surface, a breaker wheel mounted on said machine with its surface extending above the plane of said support and conveying belt means to break the glass sheet along the score line as it is moved through the machine.

References Cited in the file of this patent

UNITED STATES PATENTS

| Number | Name | Date |
|---|---|---|
| 1,996,383 | Miles | Apr. 2, 1935 |
| 2,042,819 | Allison | June 2, 1936 |
| 2,186,485 | Harm | Jan. 9, 1940 |
| 2,228,010 | Koenig | Jan. 7, 1941 |
| 2,334,223 | Smith | Nov. 16, 1943 |
| 2,504,655 | Dallas | Apr. 18, 1950 |
| 2,594,705 | Aberle | Apr. 29, 1952 |